US009236901B2

(12) United States Patent
Chen et al.

(10) Patent No.: US 9,236,901 B2
(45) Date of Patent: Jan. 12, 2016

(54) ADAPTIVE INFINITE IMPULSE RESPONSE (IIR)-BASED CODE DETECTION FOR SYMBOL-LEVEL EQUALIZER

(71) Applicant: Broadcom Corporation, Irvine, CA (US)

(72) Inventors: Hou-Shin Chen, San Diego, CA (US); Fu-Hsuan Chiu, Berkeley Heights, NJ (US)

(73) Assignee: Broadcom Corporation, Irvine, CA (US)

( * ) Notice: Subject to any disclaimer, the term of this patent is extended or adjusted under 35 U.S.C. 154(b) by 62 days.

(21) Appl. No.: 14/062,554

(22) Filed: Oct. 24, 2013

(65) Prior Publication Data

US 2015/0117498 A1    Apr. 30, 2015

(51) Int. Cl.
H04B 1/7073    (2011.01)

(52) U.S. Cl.
CPC ................................ *H04B 1/70735* (2013.01)

(58) Field of Classification Search
CPC .................. H04B 1/7093; H04B 2001/70706; H04B 1/70735
See application file for complete search history.

(56) References Cited

U.S. PATENT DOCUMENTS

2009/0141819 A1* 6/2009 Hojen-Sorensen et al. .. 375/260
2012/0224609 A1* 9/2012 McKown ...................... 375/147

* cited by examiner

*Primary Examiner* — Curtis Odom
(74) *Attorney, Agent, or Firm* — Sterne, Kessler, Goldstein & Fox P.L.L.C.

(57) ABSTRACT

Code detection to assist a symbol-level equalizer in a receiver is described. In an embodiment, code detection uses adaptive Infinite Impulse Response (IIR) filtering to determine spreading code usage information and active code channels in a received signal. The spreading code usage information indicates if a spreading code associated with a code channel is among spreading codes used in the received signal. In another embodiment, the spreading code usage information is determined based on a forgetting factor associated with the filtering of a symbol power associated with the code channel.

20 Claims, 5 Drawing Sheets

ADAPTIVE INFINITE IMPULSE RESPONSE (IIR)-BASED CODE DETECTION FOR SYMBOL-LEVEL EQUALIZER

TECHNICAL FIELD

The present disclosure relates generally to equalization, and more particularly to code detection for symbol-level equalization.

BACKGROUND

Background Art

A chip-level equalizer is commonly used in receivers (e.g., High-Speed Downlink Packet Access (HSDPA) receivers) to mitigate Inter-Symbol Interference (ISI) due to multipath channel and Multi-user Access Interference (MAI). However, the chip-level equalizer does not take into account a spreading code usage distribution used by the transmitter.

BRIEF DESCRIPTION OF THE DRAWINGS/FIGURES

The accompanying drawings, which are incorporated herein and form a part of the specification, illustrate the present disclosure and, together with the description, further serve to explain the principles of the disclosure and to enable a person skilled in the pertinent art to make and use the disclosure.

The present disclosure will be described with reference to the accompanying drawings. Generally, the drawing in which an element first appears is typically indicated by the leftmost digit(s) in the corresponding reference number.

DETAILED DESCRIPTION OF EMBODIMENTS

For purposes of this discussion, the term "module" shall be understood to include at least one of software, firmware, and hardware (such as one or more circuits, microchips, processors, or devices, or any combination thereof), and any combination thereof. In addition, it will be understood that each module can include one, or more than one, component within an actual device, and each component that forms a part of the described module can function either cooperatively or independently of any other component forming a part of the module. Conversely, multiple modules described herein can represent a single component within an actual device. Further, components within a module can be in a single device or distributed among multiple devices in a wired or wireless manner.

Figure 1:
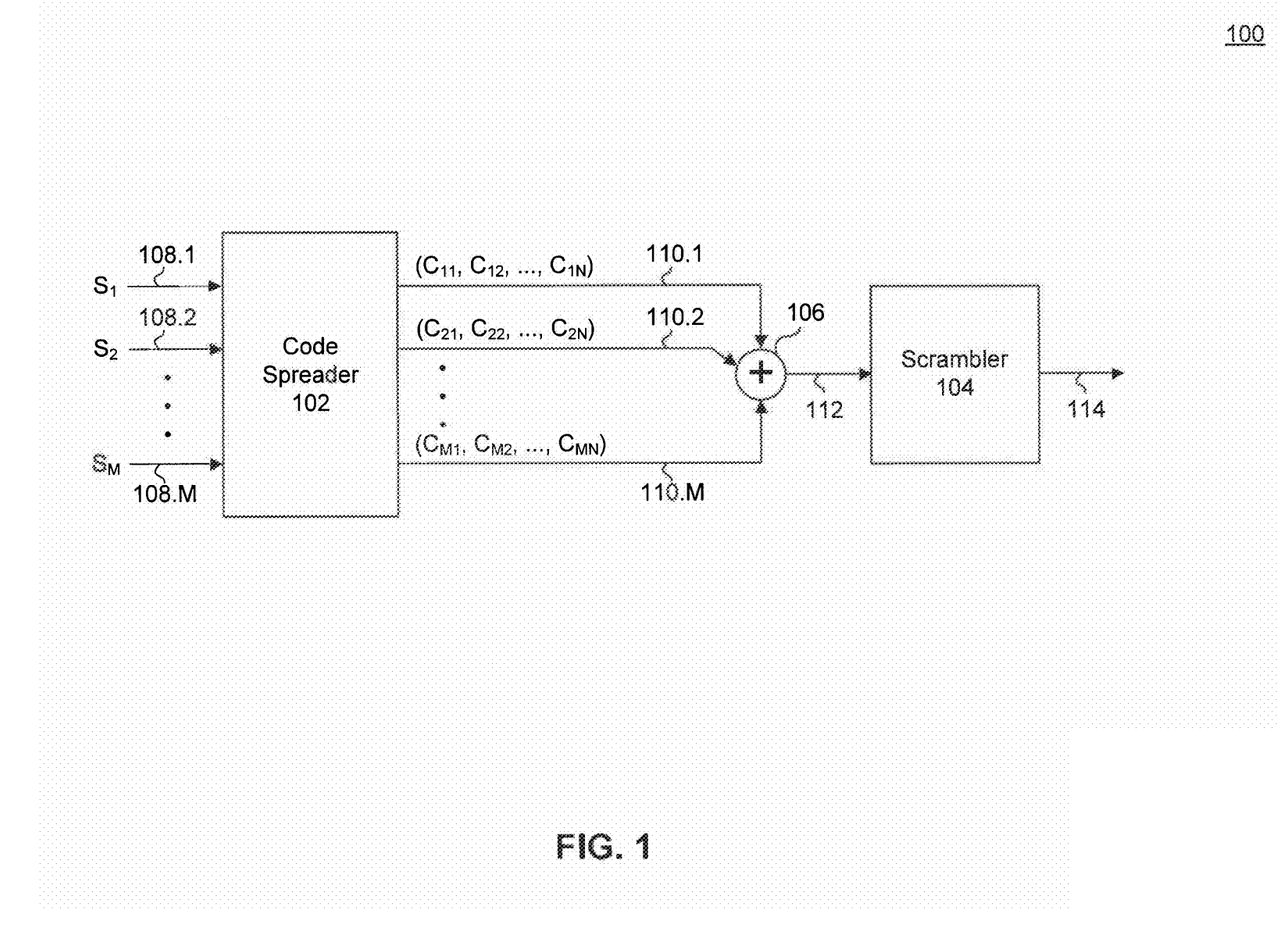
FIG. 1 illustrates an example transmitter according to an embodiment.

FIG. 1 illustrates an example transmitter 100 according to an embodiment. Example transmitter 100 is provided for the purpose of illustration only and is not limiting of embodiments. Example transmitter 100 can be located in a base station or a mobile terminal, for example. When used in a base station, example transmitter 100 can be used to transmit simultaneously to one or more mobile terminals served by the base station. As shown in FIG. 1, example transmitter 100 includes, among other components, a code spreader 102, a scrambler 104, and a combiner 106.

In an embodiment, code spreader 102 receives a plurality of modulated symbols 108.1, 108.2, . . . , 108.M ($s_1, s_2, \ldots, s_M$). For example, modulated symbols 108.1, 108.2, . . . , 108.M can be Binary Phase Shift Keying (BPSK), Quadrature Phase Shift Keying (QPSK), or Quadrature Amplitude Modulation (QAM)-modulated symbols. Modulated symbols 108.1, 108.2, , . . . , 108.M are generated from a respective plurality of data streams. When example transmitter 100 is used within a base station, the data streams can be destined to one or more mobile terminals served by the base station. For example, among modulated symbols 108.1, 108.2, . . . , 108.M, each modulated symbol may be intended to a different mobile terminal, thereby the base station providing a single data stream per mobile terminal. Alternatively, two or more of modulated symbols 108.1, 108.2, . . . , 108.M may be destined to the same mobile terminal. As such, the base station provides multiple simultaneous data streams to the mobile terminal.

Regardless of the intended recipients of the plurality of data streams, simultaneous transmission of the data streams by example transmitter 100 requires that the data streams be transmitted on orthogonal or substantially orthogonal physical channels. To achieve this requirement, code spreader 102 spreads each of modulated symbols 108.1, 108.2, . . . , 108.M using a respective spreading cede from a plurality of mutually orthogonal spreading codes. In an embodiment, the spreading codes are Orthogonal Variable Spreading Factor (OVSF) codes. Code spreader 102 may change the utilized spreading codes for a subsequent set of modulated symbols 108.1, 108.2, . . . , 108.M, in an embodiment, the length of the spreading codes is equal to N. As shown in FIG. 1, each modulated symbol 108.1, 108.2, . . . , 108.M is transformed into a respective chip sequence 110.1, 110.2, 110.M with N chips. For example, modulated symbol 108.1 is transformed into a chip sequence 110.1 with N chips $c_{11}, c_{12}, \ldots, c_{1N}$. The ratio of M to N determines a dimensional gain at a receiver of the transmitted data streams. A lower M to N ratio corresponds to a higher dimensional gain and better detection performance at the receiver.

Subsequently, chip sequences 110.1, 110.2, . . . , 110.M are combined by combiner 106 to generate a signal 112, Which is further modulated using a scrambling code by scrambler 104 to generate a chip sequence 114. The scrambling code used by scrambler 104 is associated with the base station in which example transmitter 100 is located and is used to ensure that transmissions by the base station are orthogonal or substantially orthogonal to transmissions of other nearby base stations, Because chip sequences 110.1, 110.2, . . . , 110.M are produced using mutually orthogonal spreading codes, they can be individually separated at a receiver by the application of corresponding despreading codes. As such, the respective data streams corresponding to modulated symbols 108.1, 108.2, . . . , 108.M can be thought of as being transmitted over mutually orthogonal physical channels (hereinafter referred to as code channels) associated respectively with the mutually orthogonal spreading codes.

Figure 2:
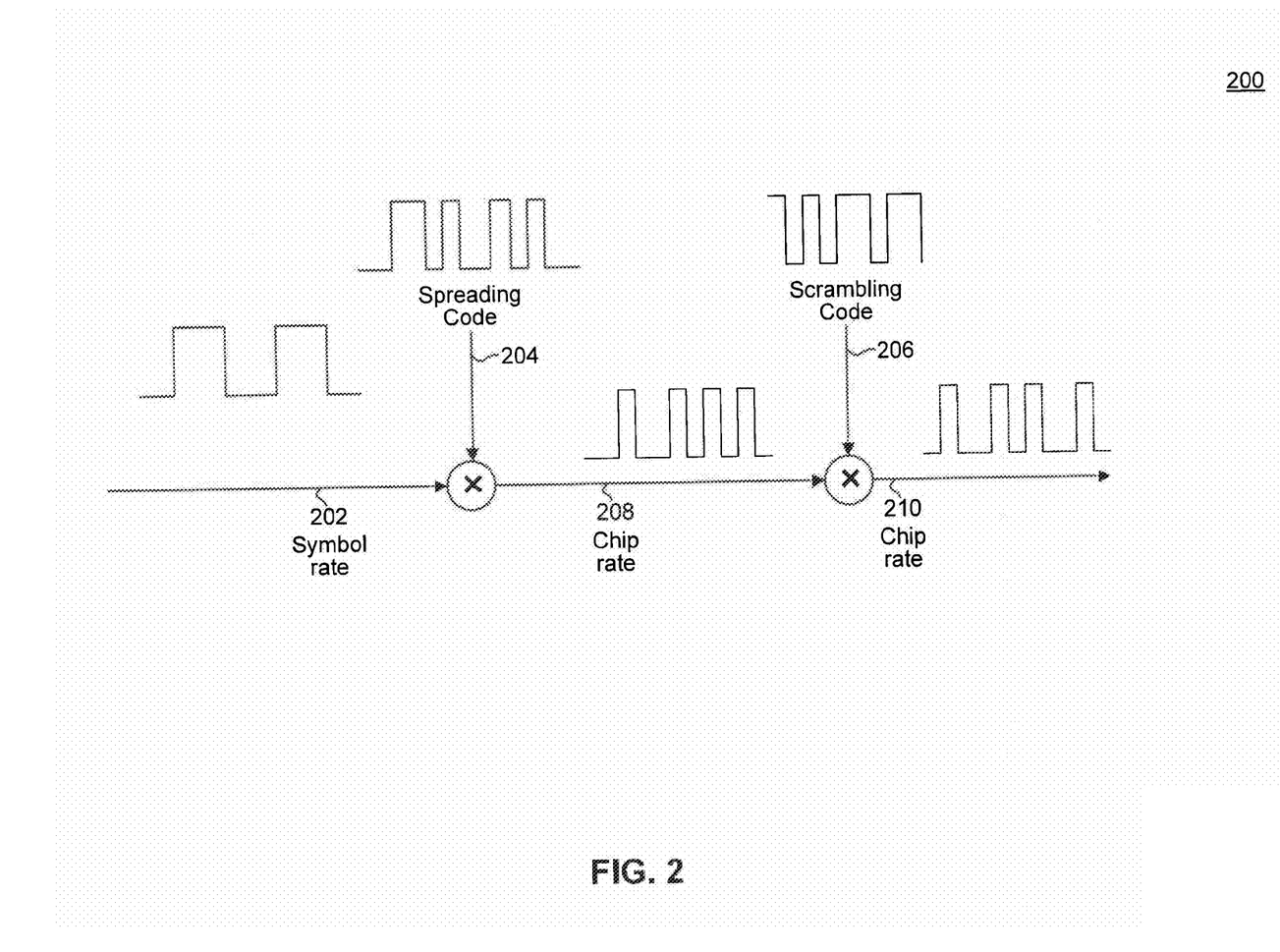
FIG. 2 is an example that illustrates scrambling and spreading of a data bit sequence.

FIG. 2 is an example 200 that illustrates the scrambling and spreading of a data bit sequence. Example 200 is provided for the purpose of illustration only and is not limiting of embodiments. As shown in FIG. 2, a data symbol sequence 202 is spread using a spreading code 204 to result in a first chip sequence 208. In an embodiment, the spreading includes multiplying data symbol sequence 202 by spreading code 204. Data symbol sequence 202 is characterized by a symbol rate, which defines the number of symbols transmitted per second. Spreading code 204 is characterized by a chip rate, which is typically greater than the symbol rate of data symbol sequence 202. As a result, first chip sequence 208 has the chip rate of spreading code 204. Subsequently, first chip sequence 208 is modulated using a scrambling code 206 to result in a second chip sequence 210. Scrambling code 206 has a chip rate equal to that of spreading code 204. As such, second chip sequence 210 has a chip rate equal to the chip rates of spreading code 204 and scrambling code 206.

Figure 3:
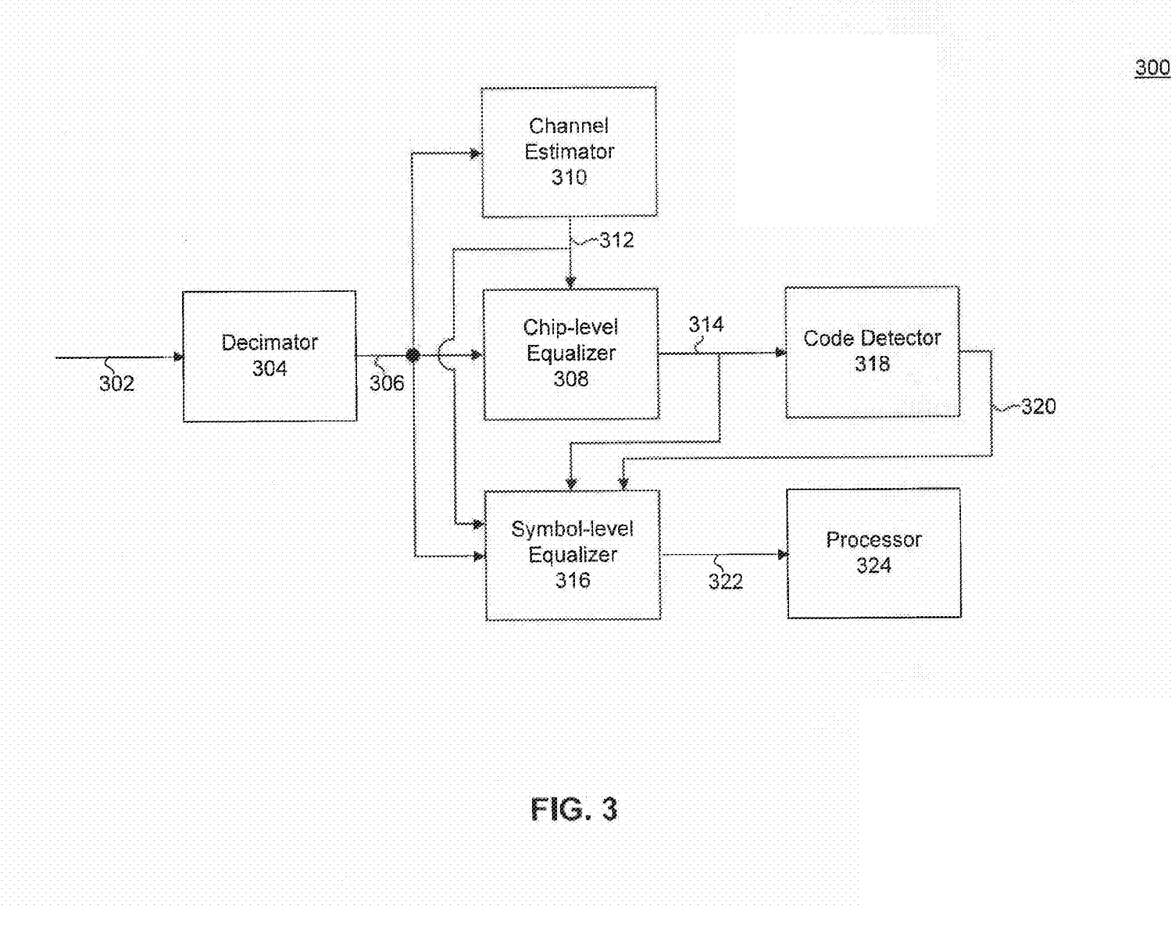
FIG. 3 illustrates an example receiver according to an embodiment.

FIG. 3 illustrates an example receiver 300 according to an embodiment. Example receiver 300 is provided for the purpose of illustration only and is not limiting of embodiments. Example receiver 300 can be located in a base station or a mobile terminal, and can be used to receive multiple simultaneous data streams transmitted by a transmitter, such as transmitter 100, for example. For the purpose of illustration only, the operation of example receiver 300 is described below over one symbol time (e.g., to receive a single instant of output signal 114 transmitted by example transmitter 100). The operation of example receiver 300 over successive symbol times is identical.

As shown in FIG. 3, example receiver 300 includes, among other components, a decimator 304, a chip-level equalizer 308, a channel estimator 310, a symbol-level equalizer 316, a code detector 318, and a processor 324. In other embodiments, decimator 304 may be optional.

Decimator 304 is configured to receive an input signal 302 and to generate a decimated input signal 306. In an embodiment, input signal 302 includes baseband in-phase (I) and quadrature (Q) samples of a signal received by example receiver 300. In another embodiment, the I and Q samples are generated by sampling the received signal at a rate higher than a chip rate used to generate the signal (for example, the sampling rate can be 8 times the chip rate). Decimator 304 acts on input signal 302 to remove samples from input signal 302, resulting in decimated input signal 306 having a lower rate than input signal 302. In an embodiment, decimated input signal 306 has a sample rate equal to the chip rate or twice the chip-rate.

In an embodiment, the received signal may have been transmitted by a transmitter, such as example transmitter 100, for example. As such, the received signal can include one or more data symbols having been spread by respective spreading codes (selected from a plurality of mutually orthogonal spreading codes) and transmitted over respective code channels associated with the respective spreading codes.

Channel estimator 310 is configured to receive decimated input signal 306. In an embodiment, channel estimator 310 can use decimated input signal 306 to estimate a channel from the transmitter (of the received signal) to example receiver 300. For example, in certain time slots and at particular frequencies, the transmitter transmits a pilot signal containing a sequence that is known to example receiver 300. Example receiver 300 can receive the pilot signal and, using channel estimator 310, can estimate the channel from the transmitter by comparing the sequence contained in the pilot signal to a locally stored replica of the sequence. In an embodiment, channel estimator 310 generates a channel estimate 312 of the channel of the transmitter, and provides channel estimate 312 to chip-level equalizer 308 and to symbol-level equalizer 316.

Chip-level equalizer 308 is configured to receive decimated input signal 306 from decimator 304 and channel estimate 312 from channel estimator 310.

Decimated input signal 306, as described above, includes chip-rate or double chip-rate samples of the received signal. Using these samples, chip-level equalizer 308 generates a first symbol estimate 314. In an embodiment, first symbol estimate 314 is a vector that includes a symbol estimate for each code channel of the available code channels. For example, if the length of the spreading codes is 256 (allowing for a maximum of 256 mutually orthogonal spreading codes or code channels), then first symbol estimate 314 includes 256 values, one for each code channel of the 256 available code channels.

In an embodiment, chip-level equalizer 308 uses a system model that assumes that chips contained in the received signal are independent and identically distributed (i.i.d.). This means that chips can be modeled as random variables that have the same probability distribution function and that are independent of each other. Accordingly, the received signal (y) can be described mathematically as:

$$y = Hz + n \quad (1)$$

where H is a channel matrix representing the channel from the transmitter to example receiver 300, z represents transmitted chips (or a vector of transmitted chips when multiple data streams are transmitted simultaneously), and n represents noise. Chip-level equalizer 308 can generate estimates $z_{chipEQ}$ of the transmitted chips by solving for z in equation (1), with H provided by channel estimate 312 from channel estimator 310.

Chip-level equalizer 308 can then use the following mathematical formula to generate first symbol estimate 314 from the estimates $z_{chipEQ}$ of the transmitted chips:

$$x_{chipEQ} = C^H S^H z_{chipEQ} \quad (2)$$

where $x_{chipEQ}$ represents the symbol estimate, $C^H$ represents the Hermitian transpose of a spreading code matrix C used by the transmitter, $S^H$ represents the Hermitian transpose of a scrambling code matrix S used by the transmitter, and $z_{chipEQ}$ represents the estimates of the transmitted chips. Typically, example receiver 300 has knowledge of the scrambling code matrix and the spreading code matrix used by the transmitter.

More particularly, first symbol estimate 314 can be obtained as:

$$x_{chipEQ} = C^H S^H (H^H H + \sigma^2 I)^{-1} H^H y \quad (3)$$

where $H^H$ represents the Hermitian transpose of the channel matrix, I represents an identity matrix, and $\sigma^2$ represents noise power.

Accordingly, chip-level equalizer 308 obtains first symbol estimate 314 by descrambling and despreading the estimates $z_{chipEQ}$ of the transmitted chips. Because chip-level equalizer 308 acts at a chip-level, first symbol estimate 314 typically has lower susceptibility to Inter-Symbol Interference (ISI) than a symbol resulting from a symbol-level equalizer due to the i.i.d. assumption of the chip equalizer signal model.

The system model used by chip-level equalizer 308 (which assumes that transmitted chips are i.i.d.) does not take into account a spreading code usage distribution used by the transmitter. However, first symbol estimate 314 can be used as the basis of an enhanced second symbol estimate 322 generated by symbol-level equalizer 316 as further described below.

Code detector 318 is configured to receive first symbol estimate 314 from chip-level equalizer 308 and to generate spreading code usage information 320 based at least in part on first symbol estimate 314. In an embodiment, code detector 318 is configured to determine, using first symbol estimate 314, a symbol power for each code channel of the plurality of available code channels, This includes both code channels used to transmit the one or more data symbols corresponding to first symbol estimate 314, and code channels that are unused. The spreading code usage information 320 thus indicates if a spreading code associated with a code channel is among the spreading codes used to spread the one or more data symbols corresponding to first symbol estimate 314. In an embodiment, as further described below, code detector 318 is configured to apply first-order adaptive Infinite Impulse Response (IIR) filtering on the symbol powers of the code channels to determine spreading code usage information 320. In another embodiment, code detector 318 determines spreading code usage information 320 based on the adaptive forgetting factors associated with the filtering of the symbol powers.

Code detector 318 provides spreading code usage information 320 to symbol-level equalizer 316. In another embodiment, code detector 318 also provides a Signal-to-Noise Ratio (SNR) matrix, which identifies the SNR for each code channel of the available code channels, to symbol-level equalizer 316. Symbol-level equalizer 316 is configured to receive decimated input signal 306, channel estimate 312 from channel estimator 310, first symbol estimate 314 from chip-level equalizer 308, and spreading code usage information 320 from code detector 318. In an embodiment, symbol-level equalizer 316 is configured to generate a second symbol estimate 322 based on first symbol estimate 314 and spreading code usage information 320.

in an embodiment, to generate second symbol level estimate 322, symbol-level equalizer 316 uses a system model that accounts for the spreading code usage distribution used by the transmitter. Accordingly, the received signal (y) can be described mathematically as:

$$y = HSCx + n \quad (4)$$

where H is a channel matrix representing the channel from the transmitter to example receiver 300, S represents a scrambling code matrix used by the transmitter, C represents a spreading code matrix used by the transmitter, x represents the transmitted symbol, and n represents noise.

Symbol-level equalizer 316 can then use the following mathematical formula to generate second symbol estimate 322:

$$x_{symEQ} = (C^H S^H H^H H S C + \Lambda^{-1})^{-1} C^H S^H H^H y \quad (5)$$

where $x_{symEQ}$ represents the symbol estimate, $C^H$ represents the Hermitian transpose of the spreading code matrix C, $S^H$ represents the Hermitian transpose of the scrambling code matrix S, $H^H$ represents the Hermitian transpose of the channel matrix H, and $\Lambda^{-1}$ is a matrix representing the inverse of the SNR of each code channel, which can be provided to symbol-level equalizer 316 by code detector 318 as described above.

Symbol-level equalizer 316 provides second symbol estimate 322 to processor 324. Processor 324 processes second symbol estimate 322 to demodulate and decode the one or more modulated symbols contained therein.

Figure 4:
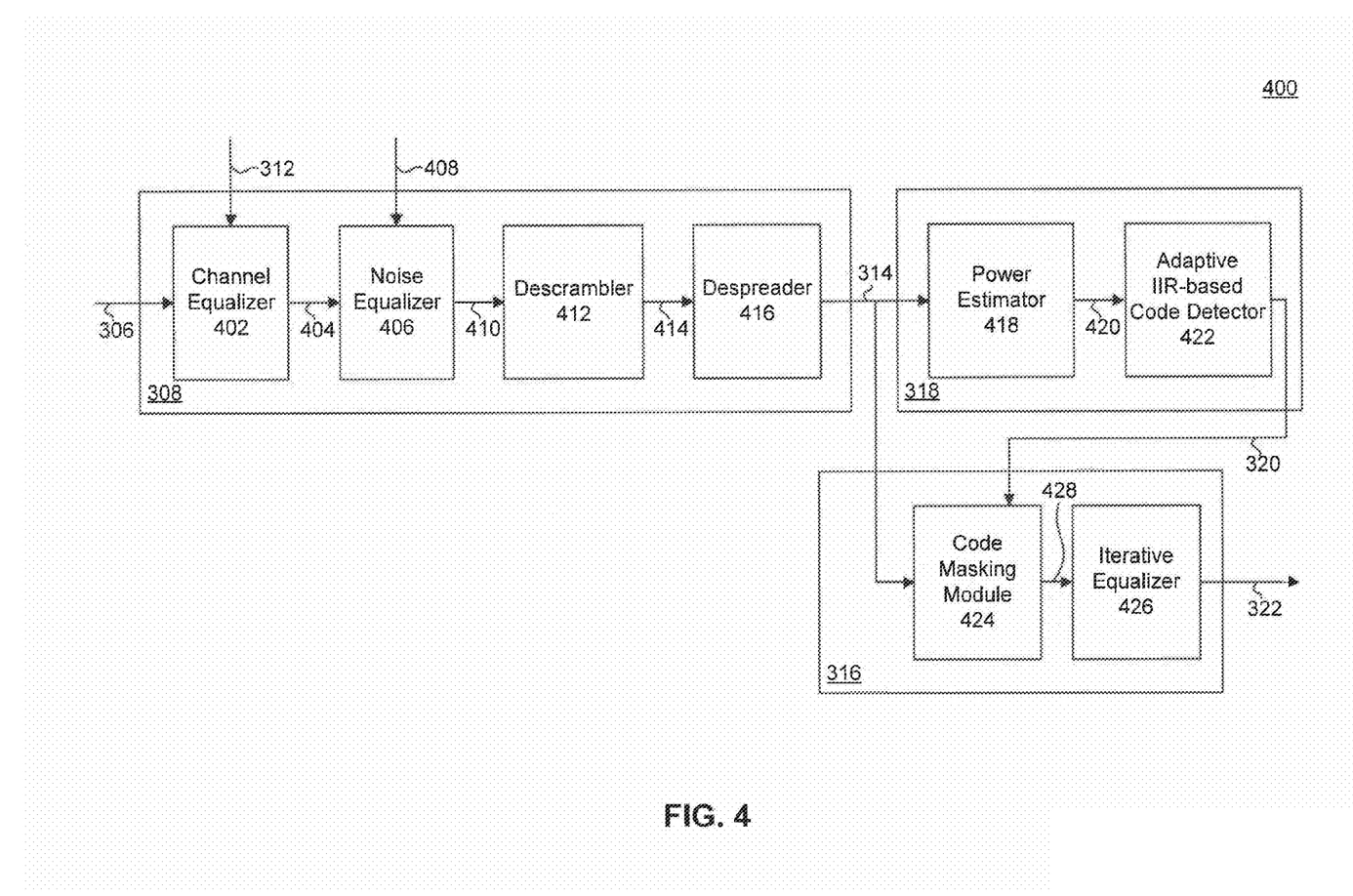
FIG. 4 illustrates another example receiver according to an embodiment.

FIG. 4 illustrates another example receiver 400 according to an embodiment. Example receiver 400 is provided for the purpose of illustration only and is not limiting of embodiments. Example receiver 400 may be an embodiment of example receiver 300 described above. As shown in FIG. 4, example receiver 400 includes, among other components, a chip-level equalizer 308, a code detector 318, and a symbol-level equalizer 316.

Chip-level equalizer 308 includes, among other components, a channel equalizer 402, a noise equalizer 406, a descrambler 412, and a despreader 416. In an embodiment, channel equalizer 402 is configured to receive decimated input signal 306, which includes chip samples of a received signal. In an embodiment, the received signal may have been transmitted by a transmitter, such as example transmitter 100, for example. As such, the received signal can include one or more data symbols having been spread by respective spreading codes (selected from a plurality of mutually orthogonal spreading codes) and transmitted over respective code channels associated with the respective spreading codes. Channel equalizer 402 uses a channel estimate 312 to generate channel equalized samples 404 based on input signal 306.

Noise equalizer 406 acts on channel equalized samples 404 to generate channel and noise equalized samples 410. In an embodiment, noise equalizer 406 uses a noise power measurement 408 to noise equalize channel equalized samples 404. Equalized samples 410 are then descrambled by descrambler 412 to generate descrambled samples 414. In an embodiment, descrambler 412 uses a descrambling code, which corresponds to a scrambling code used by the transmitter. In an embodiment, where the received signal is transmitted by a base station, the descrambling code corresponds to the base station and allows transmissions by the base station to be separated from transmissions of other nearby base stations.

Descrambled samples 414 are then despread using a despreading matrix by despreader 416 to generate first symbol estimate 314. The despreading matrix includes despreading codes that correspond to the plurality of spreading codes available at the transmitter. In an embodiment, first symbol estimate 314 is a vector that includes a symbol estimate for each code channel of the available code channels. For example, if the length of the spreading codes is 256 (allowing for a maximum of 256 mutually orthogonal spreading codes or code channels), then first symbol estimate 314 includes 256 values, one for each code channel of the 256 available code channels. First symbol estimate 314 is then provided to code detector 318 and symbol-level equalizer 316.

Code detector 318 includes, among other components, a power estimator 418 and an adaptive IIR-based code detector 422. Power estimator 418 is configured to receive first symbol estimate 314 and to generate a symbol power for each code channel of the plurality of available code channels. Power estimator 418 provides the symbol powers for the available code channels as an output signal 420 to adaptive IIR-based code detector 422.

Adaptive IIR-based code detector 422 processes output signal 420 to generate spreading code usage information 320. As described above, spreading code usage information 320 indicates which spreading codes (or code channels) were used by the transmitter to spread (convey) the one or more data symbols contained in the received signal. Code detector 422 provides spreading code usage information 320 to symbol-level equalizer 316. In another embodiment, code detector 422 also provides a SNR matrix, which identifies the SNR for each code channel of the available code channels, to symbol-level equalizer 316.

In an embodiment, adaptive IIR-based code detector 422 uses the below described algorithm to determine whether a spreading code is used or not (or its associated code channel is on or off).

Let $p_i(n)$ denote the symbol power of the i-th code channel at the n-th process iteration (or at time n). A first-order adaptive filter is applied to $p_i(n)$ at each process iteration by computing:

$$\hat{p}_i(n) = a_i(n) p_i(n-1) + (1 - a_i(n)) \hat{p}_i(n-1) \quad (6)$$

$$e_i(n) = \hat{p}_i(n) - p_i(n) \quad (7)$$

$$a_i(n) = p_i(n) - \hat{p}_i(n-1) + (1 - a_i(n)) a_i(n-1) \quad (8)$$

where $\hat{p}_i(n)$ represents a symbol power estimate of the i-th code channel at the n-th symbol-level equalizer process, $a_i(n)$ is an adaptive forgetting factor associated with the IIR filtering of the i-th code channel, and $e_i(n)$ is an error between the symbol power estimate and the actual symbol power for the i-th code channel at the n-th symbol-level equalizer process.

The adaptive forgetting factor associated with the IIR filtering of the i-th code channel is updated at the end of each process iteration according to:

$$a_i(n+1)=a_i(n)+\mu e_i(n)a_i(n) \quad (9)$$

where $\mu$ represents a predetermined step size.

The forgetting factor $a_i(n)$, the symbol power $p_i(n)$, and the symbol power estimate $\hat{p}_i(n)$ are then used to determine whether the i-th code channel is used or not (on or off). In an embodiment, if $a_i(n) > T_1$, where $T_1$ is a first predetermined threshold, then the condition $p_i(n) > T_{short}$, where $T_{short}$ is a second predetermined threshold, is tested. If $p_i(n)$ is greater than $T_{short}$, then the i-th code channel is determined to be on; otherwise, the i-th code channel is determined to be off. If otherwise $a_i(n)$ is not greater than $T_1$, then the condition $\hat{p}_i(n) > T_{long}$, where $T_{long}$ is a third predetermined threshold, is tested. If $\hat{p}_i(n)$ is greater than $T_{long}$, then the i-th code channel is determined to be on; otherwise, the i-th code channel is determined to be off. In other embodiments, $a_i(n)$ can be compared against more than two regions, defined by more than one threshold (e.g, $T_1$, $T_2$, etc.).

Symbol-level equalizer 316 includes, among other components, a code masking module 424 and an iterative equalizer 426. Code masking module 424 is configured to receive spreading code usage information 320 from code detector 318 and first symbol estimate 314 from chip-level equalizer 308. In an embodiment, as described above, first symbol estimate 314 is a vector that includes a symbol estimate for each code channel of the available code channels. Using spreading code usage information 320, code masking module 424 processes first symbol estimate 314 to mask or set to zero the symbol estimates corresponding to inactive code channels to generate an output signal 428.

Iterative equalizer 426 performs an iterative equalization process according to equation (5) above to determine second symbol estimate 322. In an embodiment, equalizer 426 uses output signal 428 as an initial value for y in equation (5). The SNR matrix in equation (5) is provided by code detector 422 in an embodiment.

Figure 5:
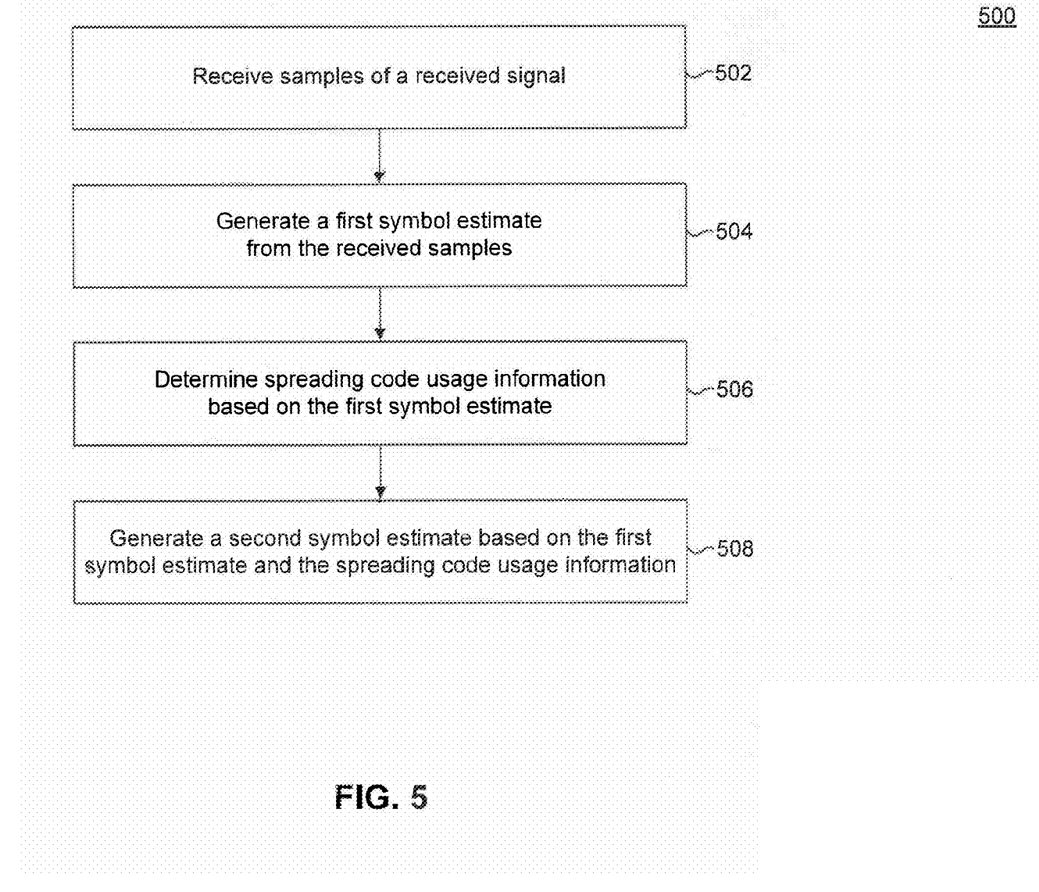
FIG. 5 is an example process according to an embodiment.

FIG. 5 is an example process 500 according to an embodiment. Example process 500 is provided for the purpose of illustration only and is not limiting of embodiments. Example process 500 can be performed by a receiver, such as example receivers 300 and 400 described above, to generate a symbol-level estimate from a received signal. In an embodiment, the received signal comprises one or more data symbols spread by respective spreading codes selected from a plurality of spreading codes. In an embodiment, the plurality of spreading codes are mutually orthogonal and are associated with respective orthogonal or substantially orthogonal code channels.

As shown in FIG. 5, example process 500 begins in step 502, which includes receiving samples of a received signal. In an embodiment, the samples are generated by sampling the received signal at a higher sampling rate than a chip rate and then optionally decimating the generated samples.

Subsequently, process 500 proceeds to step 504, which includes generating a first symbol estimate from the received samples. In an embodiment, the first symbol estimate is generated by a chip-level equalizer. The first symbol estimate can be a vector that includes a symbol estimate for each code channel of the respective code channels. In an embodiment, step 504 further comprises channel and noise equalizing the received samples to generate equalized samples; descrambling the equalized samples using a descrambling code to generate descrambled samples; and despreading the descrambled samples to generate the first symbol estimate. In an embodiment, the descrambling code corresponds to a base station transmitting the received signal.

Then, in step 506, process 500 includes determining spreading code usage based on the first symbol estimate. The spreading code usage information indicates if a spreading code associated with a code channel of the respective code channels is among the respective spreading codes used to spread the one or more data symbols contained in the received signal. In an embodiment, step 506 further includes determining, using the first symbol estimate, a symbol power of the code channel; and determining the spreading code usage information based at least in part on the symbol power. In another embodiment, a symbol power is determined for each code channel of the respective code channels using the first symbol estimate, thereby determining all used spreading codes (or active code channels) in the received signal.

In an embodiment, the spreading code usage information is determined by applying first-order adaptive IIR filtering on the symbol power and by determining the spreading code usage information based on an adaptive forgetting factor associated with the filtering of the symbol power. In another embodiment, the IIR filtering includes the steps of: computing a symbol power estimate for the code channel based on the adaptive forgetting factor, a previous symbol power, and a previous symbol power estimate associated with the code channel; computing an error based on the symbol power estimate and the symbol power; and updating the adaptive forgetting factor for the code channel based at least in part on the forgetting factor and the error.

Process 500 terminates in step 508, which includes generating a second symbol estimate based on the first symbol estimate and the spreading code usage information. In an embodiment, the second symbol estimate is generated by an iterative symbol-level equalizer using the first symbol estimate as an initial solution.

Embodiments have been described above with the aid of functional building blocks illustrating the implementation of specified functions and relationships thereof. The boundaries of these functional building blocks have been arbitrarily defined herein for the convenience of the description. Alternate boundaries can be defined so long as the Specified functions and relationships thereof are appropriately performed.

The foregoing description of the specific embodiments will so fully reveal the general nature of the disclosure that others can, by applying knowledge within the skill of the art, readily modify and/or adapt for various applications such specific embodiments, without undue experimentation, without departing from the general concept of the present disclosure. Therefore, such adaptations and modifications are intended to be within the meaning and range of equivalents of the disclosed embodiments, based on the teaching and guidance presented herein. It is to he understood that the phraseology or terminology herein is for the purpose of description and not of limitation, such that the terminology or phraseology of the present specification is to be interpreted by the skilled artisan in light of the teachings and guidance.

The breadth and scope of embodiments of the present disclosure should not be limited by any of the above-described exemplary embodiments as other embodiments will be apparent to a person of skill in the art based on the teachings herein.

What is claimed is:

1. A receiver, comprising:
a chip-level equalizer configured to receive samples of a received signal and to generate a first symbol estimate from the received samples;
a code detector configured to apply adaptive Infinite Impulse Response (IIR) filtering on a symbol power using a forgetting factor to compute a symbol power estimate and determine spreading code usage information based on a comparison of the forgetting factor and the symbol power estimate to respective thresholds, wherein the symbol power is determined using the first symbol estimate; and
a symbol-level equalizer configured to generate a second symbol estimate based on the first symbol estimate and the spreading code usage information.

2. The receiver of claim 1, wherein the chip-level equalizer is configured to:
channel and noise equalize the received samples to generate equalized samples;
descramble the equalized samples using a descrambling code to generate descrambled samples; and
despread the descrambled samples to generate the first symbol estimate.

3. The receiver of claim 2, wherein the descrambling code corresponds to a base station transmitting the received signal.

4. The receiver of claim 1, wherein the received signal comprises one or more data symbols spread by respective spreading codes selected from a plurality of spreading codes.

5. The receiver of claim 4, wherein the plurality of spreading codes are associated with a respective plurality of code channels, and wherein the symbol power is associated with a code channel of the respective plurality of code channels.

6. The receiver of claim 5, wherein the spreading code usage information indicates if a spreading code associated with the code channel is among the respective spreading codes used to spread the one or more data symbols.

7. The receiver of claim 5, wherein the code detector is further configured to:
compute an error based on the symbol power estimate and the symbol power; and
compute a next forgetting factor for the code channel based at least in part on the forgetting factor and the error.

8. A method, comprising:
receiving samples of a received signal;
generating a first symbol estimate from the received samples;
applying adaptive Infinite Impulse Response (IIR) filtering on a symbol power using a forgetting factor to compute a symbol power estimate, wherein the symbol power is determined using the first symbol estimate;
determining spreading code usage information based on a comparison of the forgetting factor and the symbol power estimate to respective thresholds; and
generating a second symbol estimate based on the first symbol estimate and the spreading code usage information.

9. The method of claim 8, further comprising:
channel and noise equalizing the received samples to generate equalized samples;
descrambling the equalized samples using a descrambling code to generate descrambled samples; and
despreading the descrambled samples to generate the first symbol estimate.

10. The method of claim 8, wherein the received signal comprises one or more data symbols spread by respective spreading codes selected from a plurality of spreading codes.

11. The method of claim 10, wherein the plurality of spreading codes are associated with a respective plurality of code channels, and wherein the symbol power is associated with a code channel of the respective plurality of code channels.

12. The method of claim 11, wherein the spreading code usage information indicates if a spreading code associated with the code channel is among the respective spreading codes used to spread the one or more data symbols.

13. The method of claim 11, further comprising:
computing an error based on the symbol power estimate and the symbol power; and
computing a next forgetting factor for the code channel based at least in part on the forgetting factor and the error.

14. A receiver, comprising:
a chip-level equalizer configured to receive samples of a received signal and to generate a first symbol estimate from the received samples, wherein the received signal comprises one or more data symbols spread by respective spreading, codes; and
a code detector configured to apply adaptive Infinite Impulse Response (IIR) filtering on a symbol power using a forgetting factor to compute a symbol power estimate and determine spreading code usage information based on a comparison of the forgetting factor and the symbol power estimate to respective thresholds, wherein the symbol power is determined using the first symbol estimate and is associated with a code channel of a respective plurality of code channels.

15. The receiver of claim 14, wherein the chip-level equalizer is configured to:
channel and noise equalize the received samples to generate equalized samples;
descramble the equalized samples using a descrambling code to generate descrambled samples; and
despread the descrambled samples to generate the first symbol estimate.

16. The receiver of claim 15, wherein the descrambling code corresponds to a base station transmitting the received signal.

17. The receiver of claim 14, wherein the spreading code usage information indicates if a spreading code associated with the code channel is among the respective spreading codes used to spread the one or more data symbols.

18. The receiver of claim 14, wherein the code detector is further configured to:
compute an error based on the symbol power estimate and the symbol power; and
compute a next forgetting factor for the code channel based at least in part on the forgetting factor and the error.

19. The receiver of claim 18, wherein the error is equal to a difference between the symbol power estimate and the symbol power.

20. The receiver of claim 18, wherein the code detector is further configured to compute the next forgetting factor for the code channel based on a predetermined step size.

* * * * *